United States Patent
Jana (10) Patent No.: US 12,271,316 B2
(45) Date of Patent: Apr. 8, 2025

(54) SYNCHRONOUS WRITE COALESCING

(71) Applicant: Avago Technologies International Sales Pte. Limited, Singapore (SG)

(72) Inventor: Arun Prakash Jana, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 90 days.

(21) Appl. No.: 18/110,818

(22) Filed: Feb. 16, 2023

(65) Prior Publication Data

US 2024/0281380 A1 Aug. 22, 2024

(51) Int. Cl.
G06F 12/0891 (2016.01)
G06F 12/0871 (2016.01)

(52) U.S. Cl.
CPC ...... G06F 12/0891 (2013.01); G06F 12/0871 (2013.01)

(58) Field of Classification Search
CPC ............. G06F 12/0871; G06F 12/0891; G06F 12/0804; G06F 12/0895; G06F 12/0877
USPC .......................................... 711/118, 143, 113
See application file for complete search history.

(56) References Cited

U.S. PATENT DOCUMENTS

| | | | | |
|---|---|---|---|---|
| 5,751,993 | A * | 5/1998 | Ofek | G06F 12/121 711/143 |
| 2018/0322051 | A1* | 11/2018 | Heller | G06F 12/0868 |
| 2019/0026033 | A1* | 1/2019 | Simionescu | G06F 11/1076 |
| 2020/0057576 | A1 | 2/2020 | Simionescu et al. | |
| 2021/0173588 | A1* | 6/2021 | Kannan | G06F 3/061 |
| 2022/0229589 | A1* | 7/2022 | Pang | G06F 3/0689 |

OTHER PUBLICATIONS

European Search Report on EP Appln. No. 24157537.2 dated Jun. 20, 2024.

* cited by examiner

*Primary Examiner* — Hashem Farrokh
(74) *Attorney, Agent, or Firm* — Foley & Lardner LLP (57) ABSTRACT

A memory system includes a firmware unit and a cache module that includes a cache controller and a cache memory. The cache controller receives an I/O message that includes a local message ID (LMID) and data to be written to a logical drive (LD), stores the data in a cache segment (CS) row of the cache memory and sends an ID of the CS row to the firmware unit. The firmware unit, in response to receiving the ID of the CS row, acquires a timestamp and stores the timestamp to check against a cache flush timeout for the CS row. The firmware unit periodically checks cache flush timeout and in response to detecting the cache flush timeout, sends a flush command with the ID of the CS row to the cache controller. The cache controller, in response to receiving the flush command, flushes the first data of the CS row.

19 Claims, 4 Drawing Sheets

SYNCHRONOUS WRITE COALESCING

BACKGROUND

When performing I/O messages to write data on a drive, write coalescing is used to execute two or more I/O message requests to write data to a same row of a same drive together in one step. The data of the two or more data writings for the same row of the same drive may be stored by a cache controller in a cache segment (CS) row in the cache memory. In addition, there is a timeout for each I/O message. A firmware unit, in communication with the cache controller, checks the timeout. When getting close to the expiration of the timeout, the firmware unit provides an instruction to the cache controller to flush the data to the drive. When the CS row becomes fully dirty, e.g., is filled with new data, the cache controller performs a proactive flush of the CS row to the drive. It is highly desirable to maintain synchronization between the cache controller and the firmware unit and resolve the problem of stale data.

BRIEF DESCRIPTION OF THE DRAWINGS

Certain features of the subject technology are set forth in the appended claims. However, for purposes of explanation, several aspects of the subject technology are depicted in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When performing I/O messaging to write data to a drive, write coalescing is used to gather together data of multiple writings to a row and perform the writing in one step to save time. In some embodiments, before writing to the drive, the data of a row is stored in a CS row of the cache memory where a CS row corresponds to a row of the drive. In some embodiments, before writing to the cache memory, a CS row of the cache memory is allocated. In addition, since each I/O message has a timeout and the hardware, e.g., the cache controller, does not have a timer, the timer is implemented by a firmware unit in communication with the cache controller. The firmware unit checks the timeout does not expire, e.g., does not timeout. At about the time of the expiration of the timeout, the firmware unit commands the cache controller to flush the data in the CS row to the drive. In addition, the data in the CS row is also flushed to the drive, when the CS row becomes fully dirty, e.g., the CS row is filled with new data. Then, the cache controller performs a proactive flush of the CS row to the drive and informs the firmware unit that the data in the CS row is flushed to the drive. Because a hardware operation is faster than a firmware operation that is performed based on a command/message queue, a synchronization between the cache module and the firmware unit is lost in some embodiments. In some embodiments, by flushing the CS row to the drive, the data in the CS row is committed, e.g., written to the drive. In some embodiments, after committing the data in the CS row to the drive, the CS row is cleaned, e.g., the CS row is marked as clean such that new data can be overwritten in the CS row.

In addition, if the cache controller performs the cleanup of the CS row after the CS row is flushed to the drive, the firmware unit may access data in the cache memory that does not exist. Also, the host, e.g., the processor, does not know about the CS rows and, thus, the I/O messages refer to a logical drive (LD) and a row number of the LD. In order to detect the timeout of the I/O message, the firmware unit receives an LD and row number of the LD and monitors the timeout based on the LD (e.g., two bytes) and row number of the LD (e.g., 8 bytes). Thus, the timeout data may easily fill a memory associated with the firmware unit and context exhaustion may happen and write coalescing may stop.

In the embodiments introduced below, instead of using the LD and the row number of the LD that takes ten bytes for tracking the timeout of multiple I/O messages, the local message ID (LMID) is used that takes two bytes because the number of LM buffers is limited, e.g., have 8k LM buffers, the ID of the LM buffers may be fit in two bytes. In some embodiments, as described above, the ID of the CS row is added to the LM buffer that is accessible, e.g., is retrievable, based on the LMID that is associated with, e.g., refers to, the local message buffer or the LM buffer. In some embodiments, the ID of the CS row that fits in one or more bytes, e.g. three bytes, is used for tracking the timeout.

Because the number of LM buffers and the number of CS rows are limited, the LM buffers and the CS rows are re-used in some embodiments and, thus, synchronization between the firmware unit and the cache module is addressed below. Although, the cache controller may proactively flush the CS row when the CS row is fully dirty, the cache controller or any other module of cache module may not initiate a purge of the CS row. In some embodiments, the cache controller sends a message to the firmware unit and the firmware unit sends an instruction to the cache module for the cleanup of the CS row as will be described below.

Figures 1A, 1B:
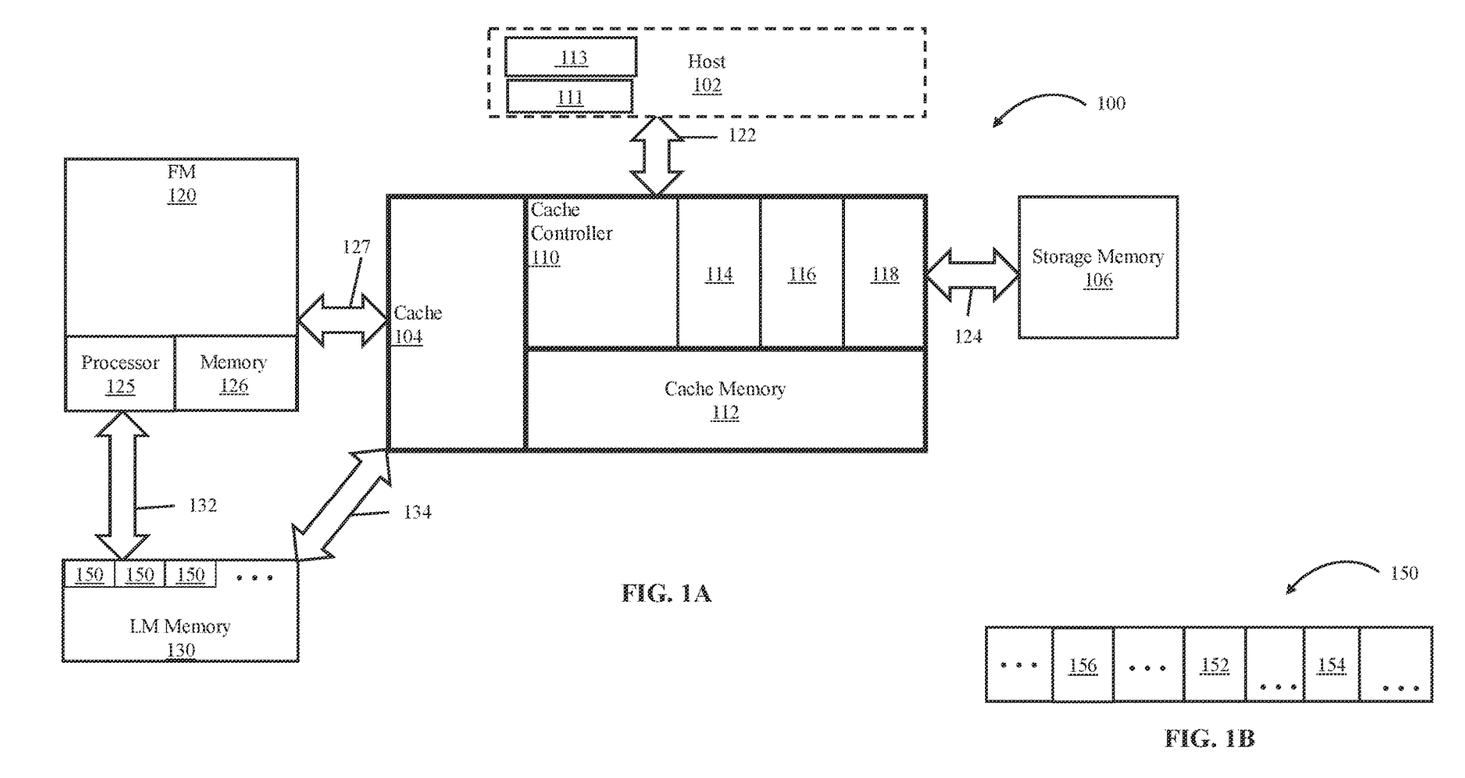
FIGS. 1A and 1B illustrate a memory system and a local message (LM) buffer.

FIGS. 1A and 1B illustrate a memory system 100 and an LM buffer 150. The memory system 100 includes a cache module 104, a storage memory 106, an LM memory 130, and a firmware unit 120 that includes a processor 125 and a firmware memory 126. In some embodiments, the host 102 communicates with the firmware unit 120 through a storage controller (not shown), which includes the firmware unit 120 and the cache controller 110 through sending messages. In addition to the processor 111, the host 102 includes a memory 113, e.g., a random access memory. The cache module 104 includes a cache controller 110 and a cache memory 112. In some embodiments, the firmware unit 120 is a non-volatile memory or includes a non-volatile memory that stores firmware instructions. In some embodiments, the cache controller 110 sends requests, via a link 127, to be executed by the instructions of the firmware unit 120 by the processor 125. In some embodiments, the firmware unit 120 sends responses back to the cache controller 110 via the link 127. In some embodiments, the storage memory 106 is a physical drive. In some embodiments, the storage memory 106 is an LD.

In some embodiments, the cache memory is an aggregate of cache segment units of 16 kilo bytes (KB), 32 kB, 48 kB, or 64 kB. The cache controller 110 includes a cache flush hardware module 114 (e.g., a cache flush module), a cache update hardware module 116 (e.g., a cache update module), and an I/O dispatcher module 118. In some embodiments, the cache controller 110 receives I/O messages and responds to I/O messages via a link 122 with a host 102. In some embodiments, a message or command from the cache controller 110 requires a series of firmware instruction to be executed on the processor 125 of the firmware unit 120. Thus, the firmware unit 120 and the host 102 execute instructions on separate processors. Firmware unit 120 services the IOs messages from the host 102 by the processor 125 and sends the status back to the host 102.

In some embodiments, the messages sent to the firmware unit 120 are queued in a message queue, e.g., an instruction queue, of the firmware unit 120 and are executed one after the other. In some embodiments, the firmware unit 120 and the host 102 have separate memories, e.g., the firmware memory 126 and the memory 113. The host 102 sends the I/O messages from the memory 113, which are received by the storage controller and sent by cache controller 110 to the cache memory 112 and/or the LM memory 130. In some embodiments, the cache controller 110 is a part of the storage controller and the I/O messages sent from the host 102 reach cache memory 112 through the link 122, which may include other hardware units that translate the host messages.

A shown in FIG. 1A, the I/O dispatcher module 118 sends and receives data with the storage memory 106 via a link 124. In some embodiments, the I/O dispatcher module 118 communicates and/or sends commands to the cache update hardware module 116. Also, the cache controller 110 and the firmware unit 120 communicate via the link 127 and send and receive data. The memory system 100 additionally shows that the firmware unit 120 communicates and sends and receives data with the LM memory 130 via a link 132 and the cache controller 110 communicates, sends, and receives data with the LM memory 130 via a link 134.

FIG. 1B shows an LM buffer 150, a single memory unit, of the LM memory 130. In some embodiments, each LM buffer has 64 bytes, 128 bytes, or more and the LM buffers are packed one after the other in the LM memory 130. Thus, the first LM buffer 150 starts at address zero, e.g., beginning, of the LM memory 130 and the Nth LM buffer 150 starts at address 128*(N−1) of the of the LM memory 130. In some embodiments, the number of the LM buffers 150 in the LM memory 130 is 8k or 16k. In some embodiments, the LMID is an index to the address or location of the LM buffer 150 and, thus, the LMID is not more than two bytes. In some embodiments, when the cache controller 110 receives and I/O message via the link 122, the I/O message includes an LMID and data to be written to the storage memory 106. The cache controller 110 uses the LMID to access a corresponding LM buffer 150 of the LM memory 130 and retrieves, e.g., extracts, a content of the LM buffer 150. The retrieved LM buffer 150 includes an ID of the LD (LDID), e.g., an address of the LD, at a memory location 152 of the LM buffer 150. In addition, the retrieved LM buffer 150 includes a row number of the LD at a memory location 154. In some embodiments, the LM memory 130 is used by the cache module 104 and by the firmware unit 120 that is in communication with the cache module 104 and, thus, the LM memory 130 is local memory for the messages. Therefore, the LM buffers 150 of the LM memory 130 are local buffers for the messages that are in communication with the cache module 104 that are stacked one after the other. Thus, the ID of the LM buffers 150 (or LMIDs) are indices of the LM buffers 150 in the LM memory 130. Additionally, the LMID refers to a memory location of the LM buffer in the LM memory 130. Therefore, assuming the LM buffer has 128 bytes, the first 128 bytes of the LM memory 130 has an ID that is zero and the $M^{th}$ 128 bytes of the LM memory 130 between an ID that is M−1.

In some embodiments, the data in the I/O message is copied to a CS row of the cache memory 112. In some embodiments, a row ID, e.g., a row number, of the CS row is copied to a memory location 156 of the LM buffer 150. In some embodiments, each LM buffer 150 includes the address, e.g., the LMID, of another LM buffer 150, e.g., the LMID corresponding to a previous I/O message with data stored in the CS row, Therefore, based on the tail LMID and the head LMID, a link list of LMIDs may be generated from the last data stored in the CS row to the first data stored in the CS row and the LMID of entire data in the CS row is accessible. In some embodiments, the LM buffer 150 corresponding to a first LMID does not include the LMID corresponding to a previous I/O message with data stored in the CS row and, thus, first LMID is a head LMID. In some embodiments, the link list of LMIDs may be generated based on only the tail LMID. In some embodiments, the LM buffer 150 in the LM memory 130 includes the LDID and the row number of the LD to be accessed in response to receiving the I/O message. In some embodiments, a physical memory based on the row number of the LD is accessed. In some embodiments, the cache controller 110 and the firmware unit 120 have access to the cache memory 112. Thus, the message 246 to the cache flush hardware module 114 to flush the data includes the tail LMID and based on the tail LMID, the entire LMIDs of the data stored in CS row are accessible.

In some embodiments, the write command is loaded by the host 102 and is executed by the processor 111 of the host 102 and the processor 111 sends the write command to the cache flush hardware module 114. In some embodiments, the cache controller 110 receives a first I/O message to write data to a drive with a first LDID and a first row number. As noted, first data in the first I/O message is copied to a CS row (having an ID for the CS row) of the cache memory 112 and the LMID of the LM buffer 150 of the LM memory 130 is added to the write-pending-list corresponding to the CS row. Then the cache controller 110 receives one or more second I/O messages to write data having the first LDID and the first row number such that the first I/O message and the one or more second I/O messages have identical, e.g., same, LDIDs and identical, e.g., same, row numbers. Second data in the second one or more I/O messages is copied, e.g., by the cache controller 110, to the same CS row of the cache memory 112 and gets appended to the first data. Before the CS row becomes fully dirty, a cache flush timeout occurs. In response to the to the cache flush timeout, a flush command, e.g., the message 246 is sent to the cache flush hardware module 114 to flush the data in the CS row to the drive. In some embodiments, a write-pending-list is generated and maintained for each CS row that includes data. The write-pending-list may include the LMIDs associated with the data in the CS row, e.g., the LMIDs of the first I/O message and the one or more second I/O messages. In some embodiments, a write-pending-list of a CS row is generated and maintained in the CS row. In some embodiments, the write-pending-list of the CS row includes a tail LMID and a head LMID. The tail LMID refers an LM buffer 150 corresponding to data last stored in the CS row and the head LMID refers an LM buffer 150 corresponding to data first stored in the CS row. In some embodiments, a timestamp associated with the first I/O message, e.g. the timestamp associated with the CS row, becomes associated with the one or more second I/O messages. In some embodiments, a command or message between the firmware unit 120 and the cache module 104 is transferred via link 127.

Figure 2:
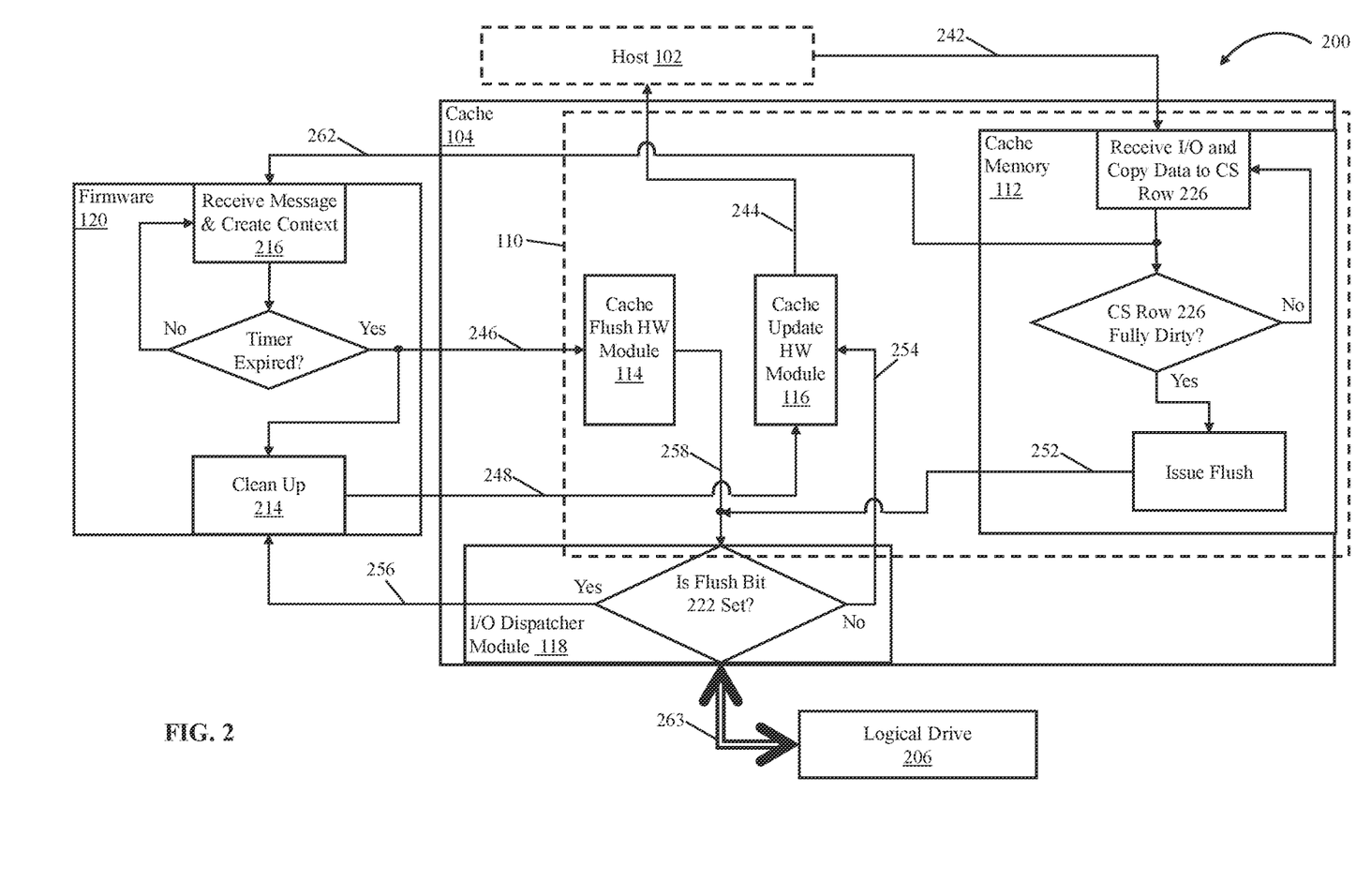
FIG. 2 illustrates a memory system, according to various aspects of the subject technology.

FIG. 2 illustrates a memory system 200, according to various aspects of the subject technology. The memory system 200 shows the cache module 104 that includes the cache flush hardware module 114, the cache update hardware module 116, the cache memory 112, and the I/O dispatcher module 118. The received I/O message includes the LMID and the data to be written to the logical drive 206. As described above, the cache controller 110 receives an I/O message 242 from the host 102 and the data in the I/O message is copied to a CS row 226. Based on the LMID, the LM buffer 150 in the LM memory 130 may be accessed and the LDID and the row number of the LD may be accessed. The cache controller 110 checks if the CS row 226 is fully dirty. If it is not fully dirty, another I/O message is received. If the CS row 226 is fully dirty, the cache controller 110 sends an issue flush command 252 and sends the issue flush command 252 to the I/O dispatcher module 118.

After the I/O message is received, a message 262 along with the ID of the CS row corresponding to CS row 226 is sent to firmware unit 120 to instruct the firmware unit 120 to acquire a timestamp for the CS row 226 and store the timestamp in the firmware memory 126 of the firmware unit 120 . . . . Thus, for each first received I/O message on a new row of an LD, a timestamp is associated with the ID of the CS row. The LMID and the corresponding ID of the CS row are stored in an item of a cache managed write-pending-list. In some embodiments, the CS row has a timeout by which the data must be flushed and the I/O must be completed back to the host, e.g., a cache flush timeout. The timestamp for the CS row of the I/O message, is periodically, e.g., repeated in a constant interval, checked against the timeout by the firmware unit 120.

In some embodiments, the issue flush command 252 includes a parity raid request (PRRQ) that includes a proactive flush bit. In response to the issue flush command 252 initiated by the cache controller 110, because the CS row 226 had been fully dirty, the proactive flush bit is set to one by the cache controller 110. On I/O completion, the I/O dispatcher module 118 checks if the proactive flush bit 222 is set to one. If the proactive flush bit 222 is set to one, then I/O dispatcher module 118 sends a flush complete message 256, e.g., a command, to the firmware unit 120. If the proactive flush bit 222 is not set to one, e.g. is set to zero, then I/O dispatcher module 118 sends a cache update message 254, e.g., a command, to the cache update hardware module 116 to clean the CS row 226 and to generate an I/O complete message 244 and sent the I/O complete message 244 to the host 102 to indicate that the I/O message 242 is done and the data is committed to the logical drive 206. Regardless of the proactive flush bit 222 being zero or one, the data is sent, by the I/O dispatcher module 118. via a communication link 263 to the logical drive 206 to be written to the drive. In some embodiments, the I/O dispatcher module 118 receives the PRRQ LMID via the issue flush command 252 initiated by the cache controller 110.

In some embodiments, the cache update hardware module 116 receives a cache update message 254 from the I/O dispatcher when the proactive flush bit 222 is not set in the flush message. In an aspect of the subject technology, the cache controller further receives one or more second I/O messages. An LDID and a row number of the LD of the second I/O messages are identical with the LDID and the row number of the first I/O message. The cache controller also stores second data of the one or more second I/O messages in the CS row of the cache memory. The cache flush timeout is detected before the CS row becomes fully dirty, and in response to the detecting the cache flush timeout, the flush command is sent to the cache controller.

The firmware unit 120 receives the message 262 from the cache module 104 and creates a context 216. As described, the message 262 includes the ID of the CS row that stores the I/O message 242. In some embodiments, the context 216 is a table that include the ID of the CS row of the I/O message 242 and the table is created in the firmware memory 126. For each entry, the table also includes one or more timestamps, e.g., the time one or more I/O messages are received, associated with the CS row ID, e.g., the ID of the CS row. Thus, the one or more I/O messages associated with the CS row are I/O messages that are stored in the CS row. The firmware unit 120 checks, e.g., periodically checks, the timestamps associated to the IDs of the CS rows that include data for an expiration, e.g., an expiry or timeout. In response to a timestamp associated with the ID of the CS row 226 being expired, the firmware unit 120 sends a message 246, that includes the tail, e.g. the last, LMID in the write-pending-list for the ID of the CS row 226 associated with, e.g., related to, the expired timestamp to the cache flush hardware module 114. The firmware unit 120 instructs the cache flush hardware module 114 to flush the data in the CS row 226 of cache memory 112. In some embodiments, when more than one data of the I/O messages are in the CS row 226, the expired timestamp is for the I/O message received earliest, however, the entire data in the CS row 226 is flushed. In some embodiments, the earliest timestamp of the data in the CS row 226 is the timestamp of the CS row 226 or the timestamp associated with the CS row 226.

In some embodiments, the cache flush hardware module 114 derives the ID of the LD, e.g. the LDID, and the ID of the CS row 226 from the LMID and generates a message 258 that includes a parity raid request (PRRQ) with the proactive flush bit 222 that is set to zero and sends the message 258 to the I/O dispatcher module 118. Because the proactive flush bit 222 is set to zero, the I/O dispatcher module 118 sends a cache update message 254 to the cache update hardware module 116 as described above. In some embodiments, the firmware unit 120 periodically checks the timestamp at about every 2 milliseconds (msec) to about every 4 msec, where about is within 5 percent. In some embodiments, a redundant array of independent disks (RAID) configuration uses disk striping with parity. Because data and parity are striped evenly across all of the disks, no single disk is a bottleneck. Striping also allows users to reconstruct data in case of a disk failure. Thus, the PRRQ instructs the I/O dispatcher module 118 how to distribute the data to be stored over the array of disks and how to generate parities.

In some embodiments, the PRRQ is stored in the LM buffer 150 and is accessed based on the LMID, e.g., the PRRQ LMID, of the LM buffer 150. In some embodiments, the LMIDs have different types depending on the data in the LM buffer 150 that the LMID refer to. Thus, the LMID of an LM buffer 150 that includes the PRRQ may be an PRRQ LMID, e.g., an LMID of the type PRRQ. In some embodiments, receiving a command that includes the PRRQ is that a command is received that includes the PRRQ LMID and PRRQ is accessible in the LM buffer 150 associated with the PRRQ LMID.

When a ID of the CS row has waited more than cache flush timeout in the firmware unit 120 or when the flush complete message 256 is received by the firmware unit 120, a cleanup module 214 of the firmware unit is instructed to clean up the firmware context of the corresponding to the CS row ID, e.g., the CS row 226. In the case of flush complete message 256 received by firmware unit 120, when a proactive flush by the cache controller 110 is performed, the cleanup module 214 sends a message or command, e.g., a cache update message 248, to the cache update hardware module 116. In response, the cache update hardware module 116 cleans the CS row 226 and generates an I/O complete message 244 and sends the I/O complete message 244 to the host 102 to indicate that the I/O message 242 is done and the data is committed to the logical drive 206.

Figure 3A:
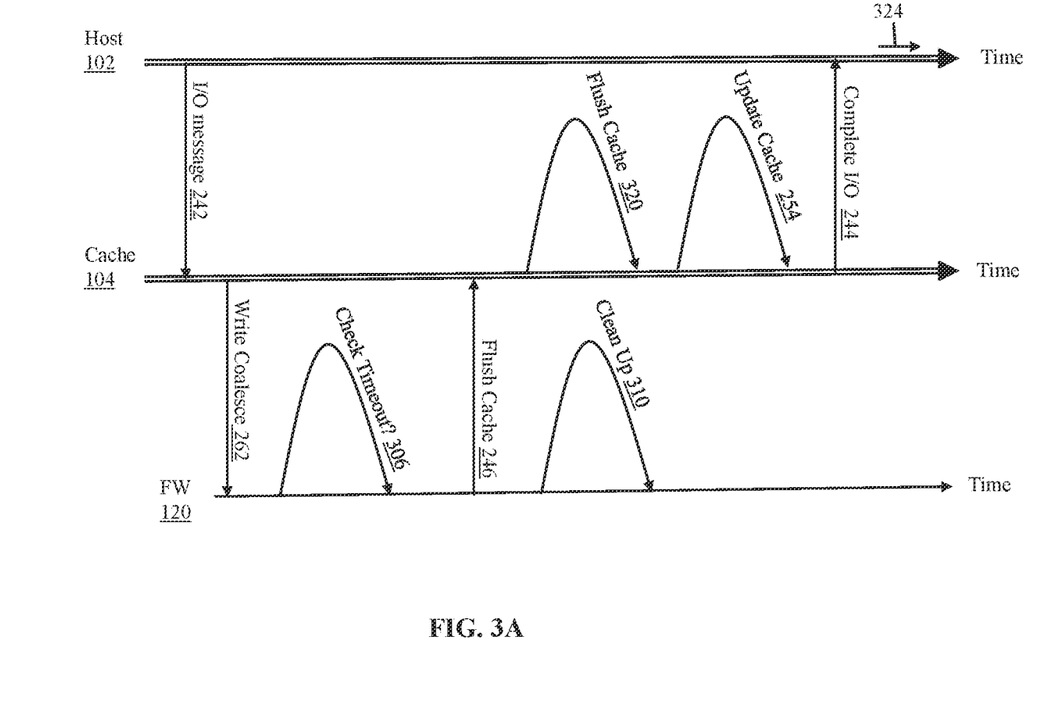
FIGS. 3A and 3B illustrate messaging of modules of a memory system, according to various aspects of the subject technology.
Figure 3B:
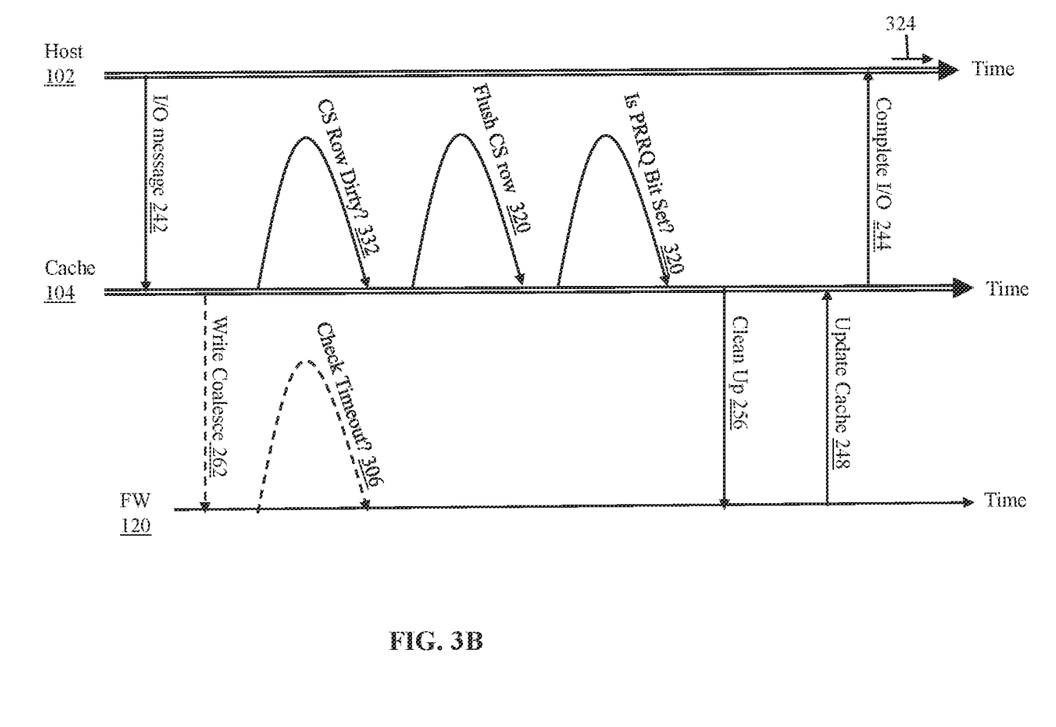

FIGS. 3A and 3B illustrate messaging of modules of a memory system, according to various aspects of the subject technology. FIGS. 3A and 3B are consistent with FIG. 2. FIG. 3A shows the steps arranged in a time 324 that corresponds to a condition that a timeout, e.g., a cache flush timeout is detected in the firmware unit 120 and shows the I/O message 242 from the host 102 to the cache module 104. Then cache module 104 sends the message 262, a write coalesce message, to the firmware unit 120 to monitor a timeout at step 306. As noted before, a command or message between the firmware unit 120 and the cache module 104 are transferred via link 127. After the timeout, e.g., when the timestamp of the ID of the CS row wait time in firmware has exceeded the cache flush timeout, e.g., a timeout has occurred, the firmware unit 120 sends the message 246 to the cache flush hardware module 114 to flush the data. The firmware unit 120 cleans up a portion of the firmware memory 126 associated with the firmware unit 120 in step 310 and removes a content of the table associated with the ID of the CS row of the flushed data. At step 320, the I/O dispatcher module 118 sends the data, via a communication link 263 to the logical drive 206 to be written to the drive. Again, the I/O dispatcher module 118 sends the cache update message 254 to the cache update hardware module 116 of the cache module 104 and sends the I/O complete message 244 to the host 102 to indicate that the I/O message 242 is complete. In some embodiments, the I/O timeout is about 30 seconds.

FIG. 3B also shows the steps arrange in the time 324 that corresponds to a condition that the CS row becomes fully dirty, e.g., all the data is new to be committed to the drive. The firmware unit 120 and shows the I/O message 242 from the host 102 to the cache module 104. When the data for I/O message 242 is stitched to the cache, the cache module checks if the CS row is fully dirty in step 332 and flushes the CS row in step 320, e.g., a proactive flush by the cache controller 110. Since the proactive flush bit is set to one, flush complete message 256 is sent by the I/O dispatcher module 118 to the firmware unit 120 for cleanup and in response the firmware unit sends the cache update message 248 as described above.

The subject technology discussed above reduces the context exhaustion of the memory of the firmware unit. In addition, the subject technology resolves the synchronization problem between the firmware unit and the cache module and resolves the problem of stale data because the firmware unit performs the cleanup of the cache memory.

According to aspects of the subject technology, a memory system includes a firmware unit and a cache module that includes a cache controller and a cache memory. The cache controller receives a first I/O message that includes an LMID and first data. The cache controller also stores the first data in a CS row of the cache memory and sends an ID of the CS row to the firmware unit. The firmware unit provides firmware instructions such that in response to receiving the CS row ID, a timestamp for the ID of the CS row, is acquired and stored. The timestamp is periodically checked for the cache flush timeout. In response to detecting the cache flush timeout a flush command is sent with the ID of the CS row to the cache controller to instruct the cache controller to flush the first data in the CS row.

In an aspect of the subject technology, the cache controller further extracts the LMID and the first data of the first I/O message and allocate a CS row for the first data, and store the LMID and the ID of the CS row in a write-pending-list, and wherein the LMID is accessible based on the ID of the CS row. In an aspect of the subject technology, the periodic check of the cache flush timeout is performed at about every 4 msec, and on expiry of the cache flush timeout, the flush command is provided through a firmware instruction to the cache controller, and the firmware instruction includes the ID of the CS row and a proactive flush bit that is set to zero. In an aspect of the subject technology, the cache controller module further includes an I/O dispatcher module and a cache flush module. The cache flush module receives the flush command with the ID of the CS row from firmware and sends the flush command with the ID of the CS row to the I/O dispatcher module to flush the first data of the CS row. The flush command includes an LMID of a type of parity raid request (PRRQ). In an aspect of the subject technology, the cache module further includes an I/O dispatcher module extracts the PRRQ LMID from the flush command, retrieves an ID of a logical drive (LD) and a row number of the LD based on the PRRQ LMID as a location to flush the first data to, and flushes the first data in the CS row to a physical destination disk based on the row number of the LD. In an aspect of the subject technology, the cache module further includes a cache update module that in response to receiving a flush complete message by the I/O dispatcher module, the I/O dispatch module detects a proactive flush bit based on the PRRQ LMID, and in response to detecting that the proactive flush bit is set to zero, the I/O dispatcher module sends a cache update message to the cache update module, and in response to the cache update message, the cache update module does cleanup the CS row and generate an I/O complete message.

According to aspects of the subject technology, a memory system includes a firmware unit and a cache module that includes a cache controller and a cache memory. The cache controller receives an I/O message that includes data and a local message ID (LMID), stores the data of the I/O message in a CS row of the cache memory, and in response to the CS row being fully dirty, generate a parity raid request (PRRQ) having a proactive flush bit that is set to one and a PRRQ LMID, store the PRRQ in an LM buffer corresponding to the PRRQ LMID, and flushes the data of the CS row. Also, in response to the proactive flush bit being set to one, sends a flush complete message with the PRRQ LMID to the firmware unit.

In an aspect of the subject technology, the cache module further includes a cache update hardware module. The firmware unit, in response to receiving the flush complete message, extracts the PRRQ LMID and provides a cache update message and the PRRQ LMID, through firmware instructions executable by a processor of the firmware unit, to the cache update module and requests to clean the CS row, and to generate an I/O complete message. In an aspect of the subject technology, the firmware unit receives the ID of the CS row from the cache module, in response to receiving the ID of CS row, stores a timestamp to check against a cache flush timeout, for the CS row, periodically checks for the cache flush timeout based on the timestamp, and before the cache flush timeout is detected, receives the flush complete message from an I/O dispatcher. In an aspect of the subject technology, the cache module further includes an I/O dispatcher module. The I/O dispatcher receives an issue flush command, retrieves the PRRQ LMID, retrieves the PRRQ and a logical drive (LD) ID and a row number of the LD based on the PRRQ LMID as a location to flush the data, and flushes the data in the CS row to the row number of the LD. Also, in response to completion of the flush, sends the flush complete message with the PRRQ LMID to the firmware unit. In an aspect of the subject technology, the I/O dispatcher module extracts the PRRQ LMID corresponding to the CS row, retrieves a logical drive (LD) ID and a row number of the LD from the PRRQ LMID as a location to flush the data and determines the destination disk, and flushes the data in the CS row to a physical destination based on the row number of the LD. In an aspect of the subject technology, the cache controller generates and maintains a write-pending-list in the cache memory. The write-pending-list includes a list of LMIDs associated with one or more I/O messages of each CS row. In an aspect of the subject technology, the I/O message is to write data to an LD.

According to aspects of the subject technology, a memory system includes a firmware unit and a cache module that includes a cache controller, a cache memory, and an I/O dispatcher module. The cache controller receives a first I/O message to write to an LD. The first I/O message comprises a first LMID and first data. The cache controller also retrieves the LD and a row number of the LD from the first LMID of the first I/O message to write to the LD, stores the data of the first I/O message in a CS row of the cache memory, incorporates an ID of the CS row and the LMID to a write-pending-list corresponding with the CS row, sends a message that includes the ID of the CS row to the firmware unit and the firmware unit provides firmware instructions that, in response to receiving the first CS row ID, saves a timestamp to check against a cache flush timeout, for the CS row, in response to receiving the ID of the CS row. Periodically checks for the cache flush timeout and in response to a proactive flush of the CS row of the cache memory by the cache controller and before the cache flush timeout is detected, receive a flush complete message and the first LMID from the I/O dispatcher module. Also, in response to receiving the flush complete message, extracts the ID of the CS row based on the first LMID, cleanup firmware context and send a cache update message including the first LMID to the cache controller to clean the CS row, and generate an I/O complete message.

In an aspect of the subject technology, the cache module further includes a cache update hardware module. The cache update hardware module cleans the CS row and generates the I/O complete message. In an aspect of the subject technology, the cache controller receives one or more second I/O messages to write to a drive that includes one or more second LMIDs and second data. The one or more second LMIDs includes a same LD and a same row number of the LD as the first LMID and generates and maintains the write-pending-list corresponding with the CS row that includes a list of one or more LMIDs associated with the first I/O message and the one or more second I/O messages of the CS row that includes the first data of the first I/O message and the second data of the one or more second I/O messages that correspond to the same row number of the same LD. In an aspect of the subject technology, the I/O dispatcher module receives a PRRQ having a proactive flush bit that is set to one, retrieves the LMID, retrieves a logical drive (LD) ID and a row number of the LD from the first LMID as a location to flush the first data, and flushes the first data in the CS row to the row number of the LD and on completion of the flush, sends the flush complete message with the first LMID referring to the PRRQ to the firmware unit. In an aspect of the subject technology, in response to the CS row being fully dirty, the cache controller generates the PRRQ having the proactive flush bit that is set to one, and sends the PRRQ and the data to the I/O dispatcher module to flush the data of the CS row. In an aspect of the subject technology, the I/O dispatcher module receives a PRRQ having a proactive flush bit that is set to zero, and sends the cache update message to the cache update hardware module to clean the CS row and to generate the I/O complete message.

Those of skill in the art would appreciate that the various illustrative blocks, modules, elements, components, memory systems, and algorithms described herein may be implemented as electronic hardware, computer software, or combinations of both. To illustrate this interchangeability of hardware and software, various illustrative blocks, modules, elements, components, memory systems, and algorithms have been described above generally in terms of their functionality. Whether such functionality is implemented as hardware or software depends on the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks should be performed. Any of the blocks may be simultaneously performed. In one or more implementations, multitasking and parallel processing may be advantageous. Moreover, the separation of various system components in the embodiments described above should not be understood as requiring such separation in all embodiments, and it should be understood that the described program components and systems could generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the term "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" and "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject but rather are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure," and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skilled in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f) unless the element is expressly recited using the phrase "means for" or, in the case of a memory system claim, the element is recited using the phrase "step for."

The previous description is provided to enable any person skilled in the art to practice the various aspects described herein. Various modifications to these aspects would be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A memory system, comprising:
a firmware unit; and
a cache module that comprises a cache controller and a cache memory, the cache controller is configured to:
receive a first I/O message that comprises a local message ID (LMID) and first data,
store the first data in a cache segment (CS) row of the cache memory, and
send an ID of the CS row to the firmware unit; and
wherein the firmware unit is configured to provide firmware instructions to:
in response to receiving the ID of the CS row, acquire a timestamp for the ID of the CS row;
store the timestamp, and
periodically check for a cache flush timeout,
in response to detecting the cache flush timeout, send a flush command with the ID of the CS row to the cache controller, wherein in response to receiving the flush command, the cache controller is configured to flush the first data of the CS row; and
wherein the cache controller is configured to extract the LMID and the first data of the first I/O message, allocate a CS row for the first data, and store the LMID and the ID of the CS row in a write-pending-list of the CS row, and wherein the LMID is accessible based on the ID of the CS row.

2. The memory system of claim 1, wherein the periodically check of the cache flush timeout is performed at about every 100 milliseconds (msec), wherein on expiry of the cache flush timeout, the flush command is provided through a firmware instruction to the cache controller, and wherein the firmware instruction comprises the ID of the CS row and a proactive flush bit that is set to zero.

3. The memory system of claim 1, wherein the cache module further comprises an I/O dispatcher module and a cache flush module, wherein the cache flush module is configured to:
receive the flush command that comprises the ID of the CS row, and
send the flush command with the ID of the CS row to the I/O dispatcher module to flush the first data of the CS row, wherein the flush command comprises an LMID of a type of parity raid request (PRRQ).

4. The memory system of claim 3, wherein the I/O dispatcher module is configured to:
extract an PRRQ LMID from the flush command,
retrieve an ID of a logical drive (LD) and a row number of the LD based on the PRRQ LMID as a location to flush the first data to, and
flush the first data in the CS row to a physical destination based on the row number of the LD.

5. The memory system of claim 4, wherein the cache module further comprises a cache update module, wherein in response to receiving a flush complete message by the I/O dispatcher module, detecting a proactive flush bit based on the PRRQ LMID, wherein in response to detecting the proactive flush bit is set to zero, the I/O dispatcher module is further to send a cache update message to the cache update module, and wherein in response to the cache update message, the cache update module is configured to:
cleanup the CS row, and
generate an I/O complete message.

6. The memory system of claim 1, wherein the cache controller is further configured to receive one or more second I/O messages, and wherein an LDID and a row number of the LD of the second I/O messages are identical with the LDID and the row number of the first I/O message; and
the cache controller is also configured to store second data of the one or more second I/O messages in the CS row of the cache memory, wherein the cache flush timeout is detected before the CS row becomes fully dirty, and wherein in response to the detecting the cache flush timeout, the flush command is sent to the cache controller.

7. A memory system, comprising:
a firmware unit; and
a cache module that comprises a cache controller and a cache memory;
wherein the cache controller is configured to:
receive an I/O message that comprises data and a local message ID (LMID),
store the data of the I/O message in a cache segment (CS) row of the cache memory,
in response to the CS row being fully dirty, generate a parity raid request (PRRQ) having a proactive flush bit that is set to one, store the PRRQ in an LM buffer corresponding to the LMID to make the LMID a PRRQ LMID, and flush the data of the CS row, and
in response to the proactive flush bit being set to one, send a flush complete message with the PRRQ LMID to the firmware unit.

8. The memory system of claim 7, wherein the cache module further comprises a cache update module, and wherein the firmware unit is configured to:
in response to receiving the flush complete message, extract the PRRQ LMID and provide a cache update message and the PRRQ LMID, through firmware instructions executable by a processor of the firmware unit, to the cache update module and request to:
clean the CS row, and
generate an I/O complete message.

9. The memory system of claim 7, wherein the firmware unit is further configured to:
receive an ID of the CS row from the cache module,
in response to receiving the ID of CS Row, store a timestamp to check against a cache flush timeout, for the CS row,
periodically check for the cache flush timeout based on the timestamp, and
before the cache flush timeout is detected, receive the flush complete message from an I/O dispatcher.

10. The memory system of claim 7, wherein the cache module further comprises an I/O dispatcher module, and the I/O dispatcher module is configured to:
receive an issue flush command,
retrieve the PRRQ LMID, retrieve the PRRQ and a logical drive (LD) ID and a row number of the LD based on the PRRQ LMID as a location to flush the data,
flush the data in the CS row to the row number of the LD, and
in response to completion of the flush, send the flush complete message with the PRRQ LMID to the firmware unit.

11. The memory system of claim 10, wherein the I/O dispatcher module is configured to:
extract the PRRQ LMID corresponding to the CS row,
retrieve a logical drive (LD) ID and a row number of the LD from the PRRQ LMID as a location to flush the data and determine a destination disk,
flush the data in the CS row to a physical destination based on the row number of the LD.

12. The memory system of claim 7, wherein the cache controller is further configured to generate and maintain a write-pending-list in the cache memory, wherein the write-pending-list comprises a list of LMIDs associated with one or more I/O messages for each CS row.

13. The memory system of claim 7, wherein the I/O message is to write data to a logical drive.

14. A memory system, comprising:
a firmware unit; and
a cache module that comprises a cache controller, a cache memory, and an I/O dispatcher module;
wherein the cache controller is configured to:
receive a first I/O message to write to a logical drive (LD), wherein the first I/O message comprises a first local message ID (LMID) and first data,
retrieve the LD and a row number of the LD from the first LMID of the first I/O message to write to the LD,
store the first data of the first I/O message in a cache segment (CS) row of the cache memory,
incorporate an ID of the CS row and the LMID to a write-pending-list corresponding with the CS row,
send a message that comprises the ID of the CS row to the firmware unit; and
wherein the firmware unit is configured to provide firmware instructions to:
save a timestamp to check against a cache flush timeout, for the CS row, in response to receiving the ID of the CS row,
periodically check for the cache flush timeout,
in response to a proactive flush of the CS row of the cache memory by the cache controller and before the cache flush timeout is detected, receive a flush complete message and the first LMID from the I/O dispatcher module, and
in response to receiving the flush complete message, extract the ID of the CS row based on the first LMID, cleanup firmware context and send a cache update message including the first LMID to the cache controller to:
clean the CS row, and
generate an I/O complete message.

15. The memory system of claim 14, wherein the cache module further comprises a cache update module, and wherein the cache update module is configured to clean the CS row and to generate the I/O complete message.

16. The memory system of claim 14, wherein the cache controller is further configured to:
receive one or more second I/O messages to write to a drive that comprises one or more second LMIDs and second data, wherein the one or more second LMIDs comprises a same LD and a same row number of the LD corresponding an ID of a CS row as the first LMID; and generate and maintain the write-pending-list corresponding with the CS row that comprises a list of one or more LMIDs associated with the first I/O message and the one or more second I/O messages of the CS row that comprises the first data of the first I/O message and the second data of the one or more second I/O messages that correspond to the same row number of the same LD.

17. The memory system of claim 14, wherein the I/O dispatcher module is further configured to:
receive a parity raid request (PRRQ) having a proactive flush bit that is set to one,
retrieve the first LMID, retrieve a logical drive (LD) ID and a row number of the LD from the first LMID as a location to flush the first data, and
flush the first data in the CS row to the row number of the LD and on completion of the flush, send the flush complete message with the first LMID referring to the PRRQ to the firmware unit.

18. The memory system of claim 17, wherein the cache controller is further configured to:
in response to the CS row being fully dirty, generate the PRRQ having the proactive flush bit that is set to one, and
send the PRRQ and the first data to the I/O dispatcher module to flush the first data of the CS row.

19. The memory system of claim 17, wherein the I/O dispatcher module is further configured to:
receive a parity raid request (PRRQ) having the proactive flush bit that is set to zero, and
send the cache update message to the cache update module to clean the CS row and to generate the I/O complete message.

* * * * *